(12) United States Patent
DeChristopher

(10) Patent No.: US 10,674,658 B2
(45) Date of Patent: Jun. 9, 2020

(54) HEADER FOR AN AGRICULTURAL HARVESTER HAVING AN INFEED CONVEYOR CONNECTED TO A CENTER KNIFE DRIVE

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 206 days.

(21) Appl. No.: 15/799,137

(22) Filed: Oct. 31, 2017

(65) Prior Publication Data

US 2019/0124832 A1    May 2, 2019

(51) Int. Cl.
*A01D 34/30* (2006.01)
*A01D 34/33* (2006.01)
*A01D 34/34* (2006.01)
*A01D 41/14* (2006.01)

(52) U.S. Cl.
CPC .......... *A01D 34/30* (2013.01); *A01D 34/33* (2013.01); *A01D 34/34* (2013.01); *A01D 41/142* (2013.01)

(58) Field of Classification Search
USPC ........................................................ 56/257
See application file for complete search history.

(56) References Cited

U.S. PATENT DOCUMENTS

| | | | |
|---|---|---|---|
| 1,598,843 A * | 9/1926 | Bauercamper | A01D 34/04 56/16.2 |
| 3,074,221 A | 1/1963 | Martins | |
| 3,763,638 A | 10/1973 | Vogelenzang | |
| 3,896,610 A * | 7/1975 | Hiniker | A01D 34/30 56/15.8 |
| 4,198,803 A | 4/1980 | Quick et al. | |
| 4,236,370 A * | 12/1980 | Shaver | A01D 34/18 56/259 |
| 4,446,683 A | 5/1984 | Rempel et al. | |
| 4,866,921 A * | 9/1989 | Nagashima | A01D 34/30 56/257 |

(Continued)

FOREIGN PATENT DOCUMENTS

| | | |
|---|---|---|
| EP | 3090615 A1 | 11/2016 |
| EP | 3167701 A1 | 5/2017 |
| WO | 20120166666 A1 | 12/2012 |

OTHER PUBLICATIONS

Extended European Search Report for EP Application No. 18203209.4 dated Feb. 15, 2019 (six pages).

*Primary Examiner* — Thomas B Will
*Assistant Examiner* — Mai T Nguyen
(74) *Attorney, Agent, or Firm* — Patrick Sheldrake; Peter Zacharias

(57) ABSTRACT

A header for an agricultural harvester comprising a frame and first and second anteriorly facing, oppositely driven epicyclical cutter bar knife drives connected to the frame. A roller shaft extends between and operatively connects the first and second epicyclical drives. The roller shaft or a drive roller drives rotation of a header infeed conveyor. The anteriorly facing epicyclical knife drives effectively rid themselves of harmful dirt and debris thereby prolonging the service life of the epicyclical knife drives.

18 Claims, 7 Drawing Sheets

(56) References Cited

U.S. PATENT DOCUMENTS

| | | | |
|---|---|---|---|
| 4,891,932 A * | 1/1990 | Johnson | A01D 41/14 56/158 |
| 5,201,168 A * | 4/1993 | Jenson | A01D 44/00 56/260 |
| 5,463,857 A | 11/1995 | Blosser | |
| 5,497,605 A * | 3/1996 | Underwood | A01D 34/30 56/14.6 |
| 6,314,707 B1 | 11/2001 | Ryan | |
| 6,889,492 B1 | 5/2005 | Polk et al. | |
| 7,730,709 B2 | 6/2010 | Priepke | |
| 7,788,891 B2 | 9/2010 | Puryk et al. | |
| 8,011,272 B1 | 9/2011 | Bich et al. | |
| 8,151,547 B2 | 4/2012 | Bich et al. | |
| 9,668,407 B2 * | 6/2017 | Cook | A01D 34/145 |
| 2011/0232249 A1 | 9/2011 | McIlwain | |

* cited by examiner

HEADER FOR AN AGRICULTURAL HARVESTER HAVING AN INFEED CONVEYOR CONNECTED TO A CENTER KNIFE DRIVE

The exemplary embodiments of present invention relate generally to a header of a plant cutting machine (e.g., a combine harvester) and, more specifically, to a header having centrally located epicyclical knife drives connected by an infeed conveyor roller shaft.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally of the header.

Epicyclical cutter bar knife drives oscillate first and second sickle mechanisms of cutter bars in opposite directions in order to cut crop. However, conventional epicyclical knife drives are disposed in a substantially horizontal orientation with substantially vertical output shafts that engage the sickle mechanism. As such, they are prone to accumulation of dirt and debris which leads to degradation of seals and premature wear of gears and other components. Moreover, conventional centrally mounted epicyclical knife drives are significantly spaced from an infeed conveyor due to their construction and orientation, which results in less efficient conveyance of cut crop to the feederhouse due to loss of crop between the knife drive and the infeed conveyor or crop stalling. In addition, due to the configuration and assembly of such epicyclical drives on a header, they generate moments or other forces that can lead to stresses in the knife drives as well as at the connections of the driver elements to the cutter bars.

BRIEF SUMMARY OF THE DISCLOSURE

In accordance with an exemplary embodiment there is provided a header for an agricultural harvester comprising a frame supporting an infeed conveyor, a first epicyclical drive, a second epicyclical drive and a roller shaft. The first epicyclical drive is adjacent a forward end of the infeed conveyor and operatively connected to a first cutter bar and the second epicyclical drive is adjacent the forward end of the infeed conveyor and operatively connected to a second cutter bar. The roller shaft extends between the first and second epicyclical drives and is operatively connected to the first epicyclical drive, the second epicyclical drive and the infeed conveyor. The first and second epicyclical drives is driven by the other of the first and second epicyclical drives via the roller shaft. When the first epicyclical drive rotates in a first direction, the roller shaft rotates the second epicyclical drive gear in a second direction opposite the first direction.

An aspect of the exemplary embodiment is that the roller shaft engages a medial side and a rear end of the first and second epicyclical drives. The roller shaft has a longitudinal axis that extends parallel or substantially parallel to a longitudinal axis of one of the first and second cutter bars.

Another aspect of the exemplary embodiment is that each of the first and second epicyclical drives rotate about an axis perpendicular to or substantially transverse to a longitudinal axis of the first and second cutter bars and a longitudinal axis of the roller shaft. Another aspect of the exemplary embodiment is that the header further comprises a drive mechanism for driving rotation of one of the first and second epicyclical drives. The drive mechanism can be a drive shaft that drives rotation of the infeed conveyor.

Another aspect of the exemplary embodiment is that the header further comprises a driven roller and an endless belt extending between the driven roller and the roller shaft, wherein the roller shaft drives rotation of the endless belt. The roller shaft has a longitudinal length greater than a width of the infeed conveyor. The infeed conveyor is positioned between the first and second epicyclical drives and has a forward end adjacent one of the first and second cutter bars. The infeed conveyor is spaced from one of the first and second cutter bars less than about 12 inches and preferably less than about 6 inches.

Another aspect of the exemplary embodiment is that the header further comprises a drive roller and an endless belt extending between the drive roller and the roller shaft, wherein the drive roller drives rotation of the endless belt, the roller shaft and the first and second epicyclical drives.

In accordance with the exemplary embodiments, there is provided an epicyclical knife drive configured to drive a first cutter bar and a second epicyclical drive configured to drive a second cutter bar, wherein a roller shaft extends between and operatively connects the first and second epicyclical drives. According to an exemplary embodiment, the roller shaft drives rotation of a header infeed conveyor. According to another exemplary embodiment, a drive roller drives rotation of the header infeed conveyor, the roller shaft and the first and second epicyclical drives. When the subject disclosure is used in combination with an agricultural harvester, the disclosure overcomes one or more of the disadvantages referenced above. For example, the subject disclosure provides a header having epicyclical knife drives connected by a roller shaft, whereby the roller shaft causes the infeed conveyor to be moved closer to the cutter bars as compared to conventional headers, thereby resulting in less loss of crop between the knife drive and the infeed conveyor. In addition, the subject disclosure provides a header having an anteriorly facing, and thereby a self-cleaning epicyclical knife drive that effectively rids itself of harmful dirt and debris thereby prolonging the service life of the epicyclical knife drive.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
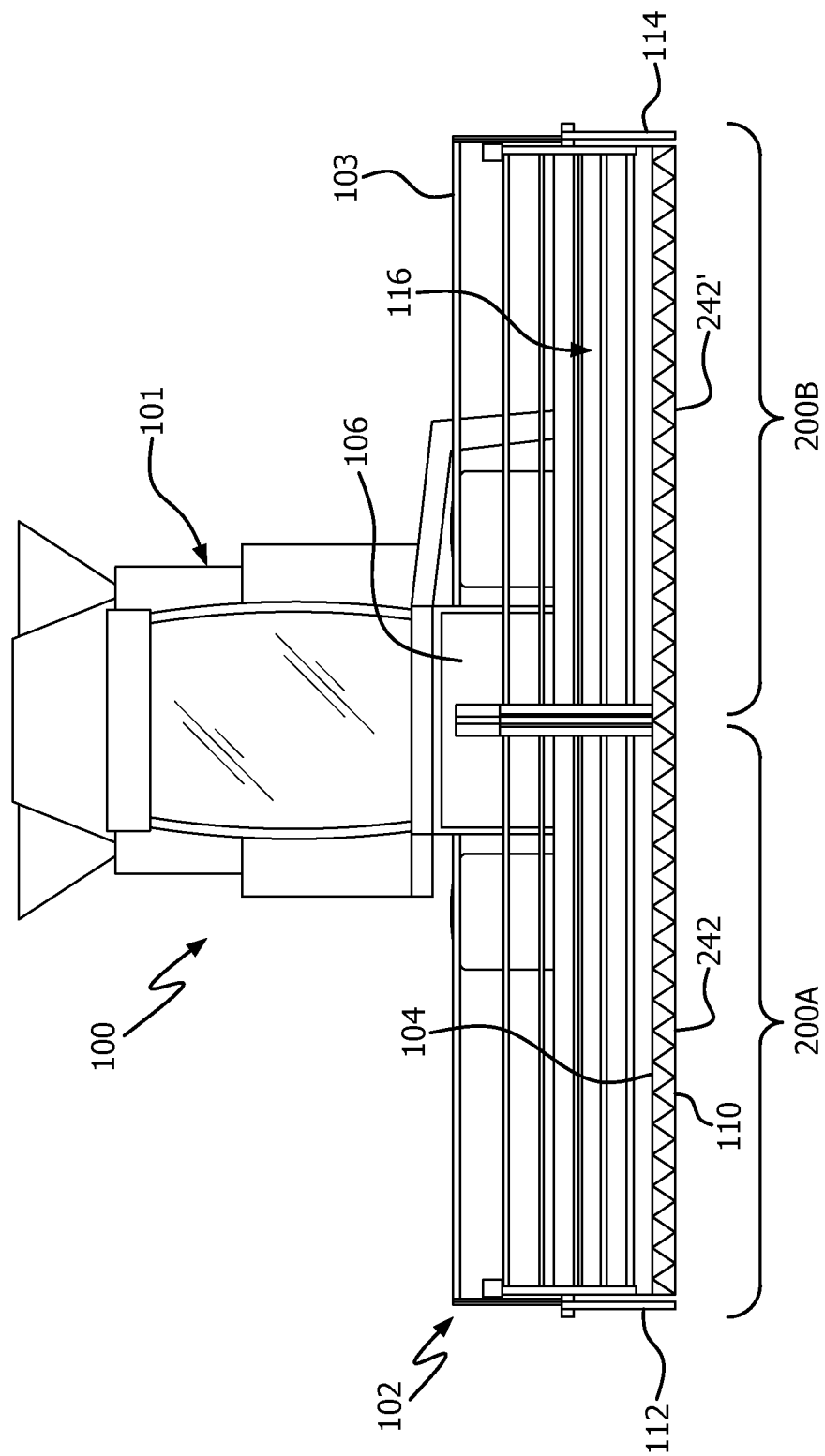
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 200A, 200B extend transversely along a forward edge of the floor 104 i.e., in a widthwise direction of the harvester. The first and second cutting assemblies 200A, 200B, described in greater detail hereinafter, are configured to cut crops in preparation for induction into the feederhouse 106. The header may include one or more draper conveyor belts for conveying cut crops to the feederhouse 106, which is configured to convey the cut crops into the harvester for threshing and cleaning as the harvester 100 moves forward over a crop field. The header 102 may include an elongated, rotatable reel 116 which extends above and in close proximity to the first and second cutting assemblies 200A, 200B. The rotatable reel 116 is configured to cooperate with the one or more draper conveyors in conveying cut crops to the feederhouse 106 for threshing and cleaning. While the foregoing aspects of the harvester are being described with respect to the header shown, the cutting assembly of the subject application can be applied to any other header having use for such a cutting assembly.

The cutting assemblies 200A, 200B extend along a forward edge 110 of the floor 104, and are generally bounded by a first side edge 112 and an opposing second side edge 114, both adjacent to the floor 104.

Figure 2:
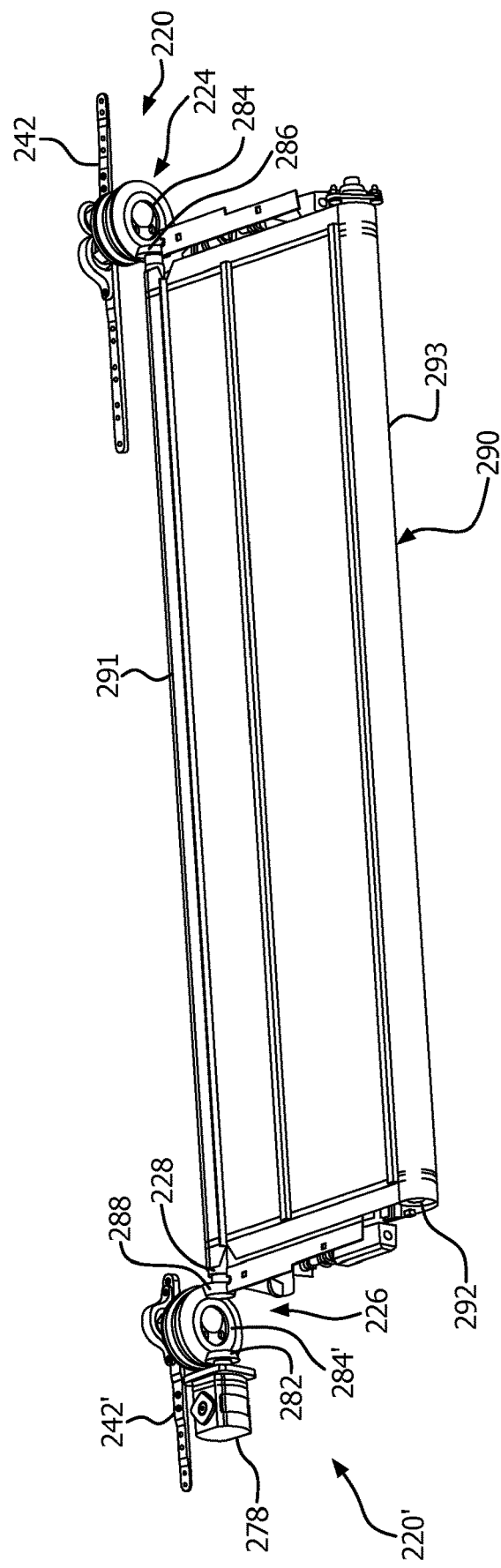
FIG. 2 is a top rear perspective view of a portion of a header in accordance with an exemplary embodiment of the subject disclosure with certain elements omitted for purposes of illustration.

According to an exemplary embodiment as shown in FIGS. 1 and 2, the cutting assemblies 200A, 200B include a first cutter bar 242 and a second cutter bar 242'. The cutting assemblies 200A, 200B are driven by knife drive assemblies 220, 220' that drive cutter knife heads, unillustrated in FIG. 1, in oscillating motion whereby the knife heads move medially and laterally to the left and right. Cutter knife heads applicable to the present exemplary embodiments are disclosed, e.g., in U.S. Pat. Nos. 7,730,709 and 8,151,547, the entire disclosures of which are incorporated by reference herein in their entirety for all purposes.

Referring to FIG. 2, the knife drive assembly 220 includes a first unillustrated housing that houses a first epicyclical drive 224 supported by the frame 103 that converts rotational motion to oscillating motion to drive the first cutter bar 242 in a manner described in more detail below. The knife drive assembly 220' includes a second unillustrated housing that houses a second epicyclical drive 226 also supported by frame 103 that converts rotational motion to oscillating motion to drive the second cutter bar 242'.

Frame 103 further supports an infeed conveyor 290. The first epicyclical drive 224 is positioned adjacent a forward end 291 of the infeed conveyor and operatively connected to the first cutter bar 242. Likewise, the second epicyclical drive 226 is positioned adjacent the forward end 291 of the infeed conveyor and operatively connected to the second cutter bar 242'. A roller shaft 228 (also shown in FIG. 4) extends between the first and second epicyclical drives 224, 226 and is operatively connected to the first epicyclical drive, the second epicyclical drive and the infeed conveyor 290.

As illustrated in FIG. 2, the first and second epicyclical drives 224, 226 face in an anterior direction or substantially in an anterior direction of the header and are mounted generally centrally along the header frame on each side of the roller shaft 228. In addition, the roller shaft 228 has a longitudinal axis that extends parallel or substantially parallel to a longitudinal axis of at least one of the first and second cutter bars 242, 242'.

Figure 3:
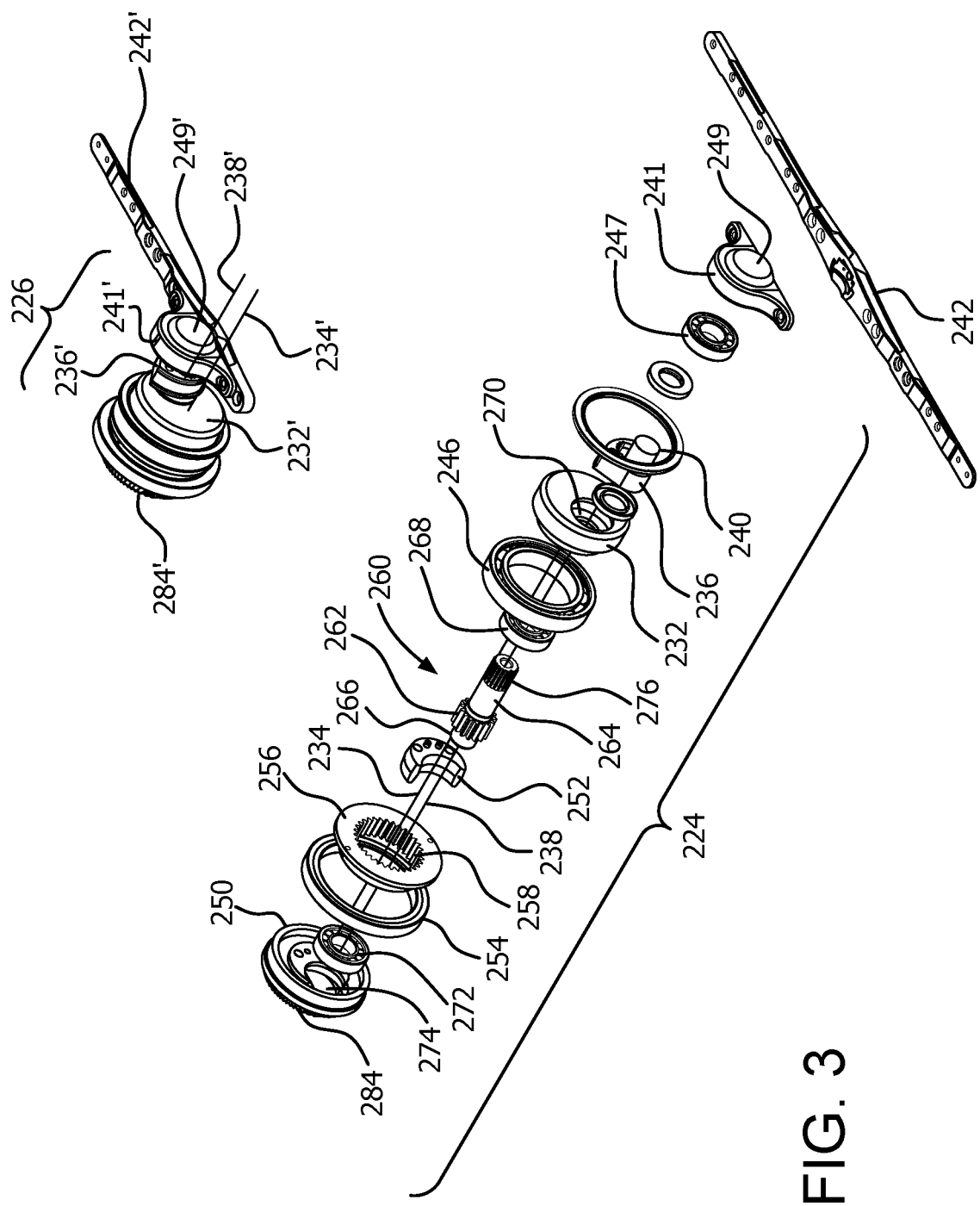
FIG. 3 is an exploded perspective view of the epicyclical knife drive assembly of FIG. 2.

Referring to FIG. 3, there is shown in an exploded perspective view the first epicyclical drive 224 and an assembled view of the second epicyclical drive 226. As shown in connection with the first epicyclical drive 224 (wherein the second epicyclical drive 226 is constructed in a mirror image-like fashion), the first epicyclical drive 224 includes a first rotatable wheel 232 having a first central rotational axis 234. The drive further includes a first flange or planetary member 236 having a first eccentric axis 238 rotatable about the first central rotational axis 234, and a first output shaft 240 spaced from the first eccentric axis 238. Operation of the first epicyclical drive results in linear oscillating or substantially linear oscillating motion of the output shaft in a direction transverse to the first central rotational axis 234.

Likewise, the second epicyclical drive 226 includes a second rotatable wheel 232' having a second central rotational axis 234'. The second epicyclical drive further includes a second flange or planetary member 236' having a second eccentric axis 238' rotatable about the second central rotational axis, and a second output shaft spaced from the second eccentric axis. The second output shaft is shrouded from view in FIG. 3 by a cover plate 249' of a pillow block 241' which, in turn, is attached to a cutter bar 242' in a manner described below. Operation of the second epicyclical drive results in linear oscillating or substantially linear oscillating motion of the output shaft in a direction transverse to the second central rotational axis. So constructed and arranged, the second central rotational axis 234' is parallel to and spaced from the first central rotational axis 234. In addition, the first central rotational axis of the first rotatable wheel is parallel to the first eccentric axis of the first flange and the first output shaft, and the second central rotational axis of the second rotatable wheel is parallel to the second eccentric axis of the second flange and the second output shaft.

The first rotatable wheel 232 is mounted for rotation on an outer bearing or bushing 246 which is seated in a forwardly facing opening of a first housing (not shown). The first rotatable wheel 232 is affixed for rotation to a first rear rotatable wheel 250 via a generally crescent-shaped connector 252 by fasteners such as screws, bolts, or the like. The first rear rotatable wheel 250 is mounted for rotation in a rear outer bearing or bushing 254 which is seated in the opening of the first unillustrated housing. Situated between the first rotatable wheel 232 and the first rear rotatable wheel 250 is a stationary central gear 256 having internal gear teeth 258. A shaft 260 has external gear teeth 262 adapted to matingly engage the internal gear teeth 258 of the central gear 256. Shaft 260 has portions 264, 266 that respectively rotate in a first inner bearing or bushing 268 which resides in an opening 270 in the first rotatable wheel 232 and a rear inner bearing or bushing 272 which resides in an opening 274 in the first rear rotatable wheel 250. The forward end of shaft 260 has a splined or toothed exterior 276 that is adapted to matingly engage a similarly splined or toothed interior of the first flange 236.

As the first rear rotatable wheel 250 rotates, the shaft 260 is caused to orbit about the first central rotational axis 234. As the shaft 260 orbits about the first central rotational axis 234, its gear teeth 262 engage gear teeth 258 of the stationary central gear 256 causing counter-rotation of the shaft 260 and the first flange 236 engaged thereby. As the first flange 236 rotates, the output shaft 240 carried thereby exhibits a linear oscillating or substantially linear oscillating motion in a direction transverse to the first central rotational axis 234.

Still referring to FIG. 3, the first rotatable wheel 232 is adjacent to the first cutter bar 242 and the second rotatable wheel 232' is adjacent to the second cutter bar 242'. Further, a distal end of the first output shaft 240 extends proud of the first flange 236 whereby the first output shaft engages the first cutter bar 242. Likewise, a distal end of the unillustrated second output shaft extends proud of the second flange 236' whereby the second output shaft engages the second cutter bar 242'. More particularly, as shown in FIG. 3, a pillow block 241 or similar structure is attached to a first cutter bar 242 by unillustrated fasteners, e.g., bolts or the like. Likewise, a pillow block 241' or similar structure is attached to a second cutter bar 242'. Pillow blocks 241, 241' define unillustrated openings for respectively receiving bearings or bushings, e.g., 247, within which are respectively received the first flange output shaft 240 and the unillustrated second flange output shaft. In this way, the first and second cutter bars 242, 242' are directly connected to the first and second flange output shafts.

The first and second cutter bars are configured, e.g., as shown in FIG. 3. As shown in FIG. 3, the first cutter bar 242 extends in a direction transverse to the first central rotational axis 234, and the second cutter bar 242' extends in a direction transverse to the second central rotational axis 234' opposite the first cutter bar. So constructed and arranged, rotation of the first and second epicyclical drives 224, 226 causes the output shafts thereof to oscillate the first and second cutter bars 242, 242' in opposite directions and along a single plane. Consequently, at one extreme in the motion of the output shafts of the first and second epicyclical drives 224, 226, the output shafts are at a minimum transverse distance from one another and at the opposite extreme the output shafts are at a maximum transverse distance from one another for purposes of vibration cancellation. As is known, vibration causes wear and tear on the various moving components of a cutter bar knife drive assembly. The present construction essentially eliminates vibration thereby effectively reducing harmful wear and tear.

As noted above, the roller shaft 228 extends between and is operatively connected to the first and second epicyclical drives 224, 226. In order to achieve effective vibration cancellation, the first and second epicyclical drives 224, 226 must be timed such that the cutter bars 242, 242' have substantially exact equal and opposite motion. Roller shaft 228 provides a timing coupling suitable to achieve this motion. Accordingly, when connected to cutter bar knife heads, as further described below, the output shafts of the first and second epicyclical drives 224, 226 move the cutter bars back and forth in horizontal or substantially horizontal motion as the cutting knives of the cutter bars cut crop while the agricultural harvester 100 and header 102 move forwardly over a crop field.

In addition, the first and second output shafts and thus the first and second central rotational axes of the first and second epicyclical drives 224, 226 extend perpendicular or substantially transverse to the cutter bars 242, 242' of the header 102. That is, each of the first and second epicyclical drives 224, 226 includes a rotatable gear assembly that rotates about an axis extending perpendicular or substantially transverse to a longitudinal axis of the first and second cutter bars 242, 242' and perpendicular or substantially transverse to a longitudinal axis of the roller shaft 228. In other words, the first epicyclical drive 224 includes an anteriorly extending output shaft 240 connected to the first cutter bar 242, and the second epicyclical drive 226 includes an anteriorly extending output shaft (not shown) connected to the second cutter bar 242'.

Thus, the central rotational axes 234, 234' of the epicyclical drives face in an anterior or substantially anterior direction whereby the first rotatable wheels 232, 232' are oriented vertically or substantially vertically, i.e., their rotational axes being horizontal or substantially horizontal. The vertical or substantially vertical orientation of the first rotatable wheels 232, 232' advantageously cause the wheels to disburse dirt and debris that strikes the wheels during operation of the agricultural harvester, thereby preventing such dirt and debris from collecting on the epicyclical drives 224, 226 and causing damage to the outer and inner bearings or bushings 254, 268. Further, the first and second flange output shaft bearings or bushings, e.g., 247, are protected from ingress of dirt and debris by the pillow block covers 249, 249' (FIG. 3).

As described in greater detail below, by virtue of the connection of the roller shaft 228 to the first and second epicyclical drives 224, 226, operational drive of the first or second epicyclical drive 224, 226 produces an oscillating motion in its respective flange output shaft as well as an identical but opposite oscillating motion in the flange output shaft of the other of the first and second epicyclical drive. In other words, one of the first and second epicyclical drives 224, 226 is driven by the other of the first and second epicyclical drives via the roller shaft 228.

Figure 4:
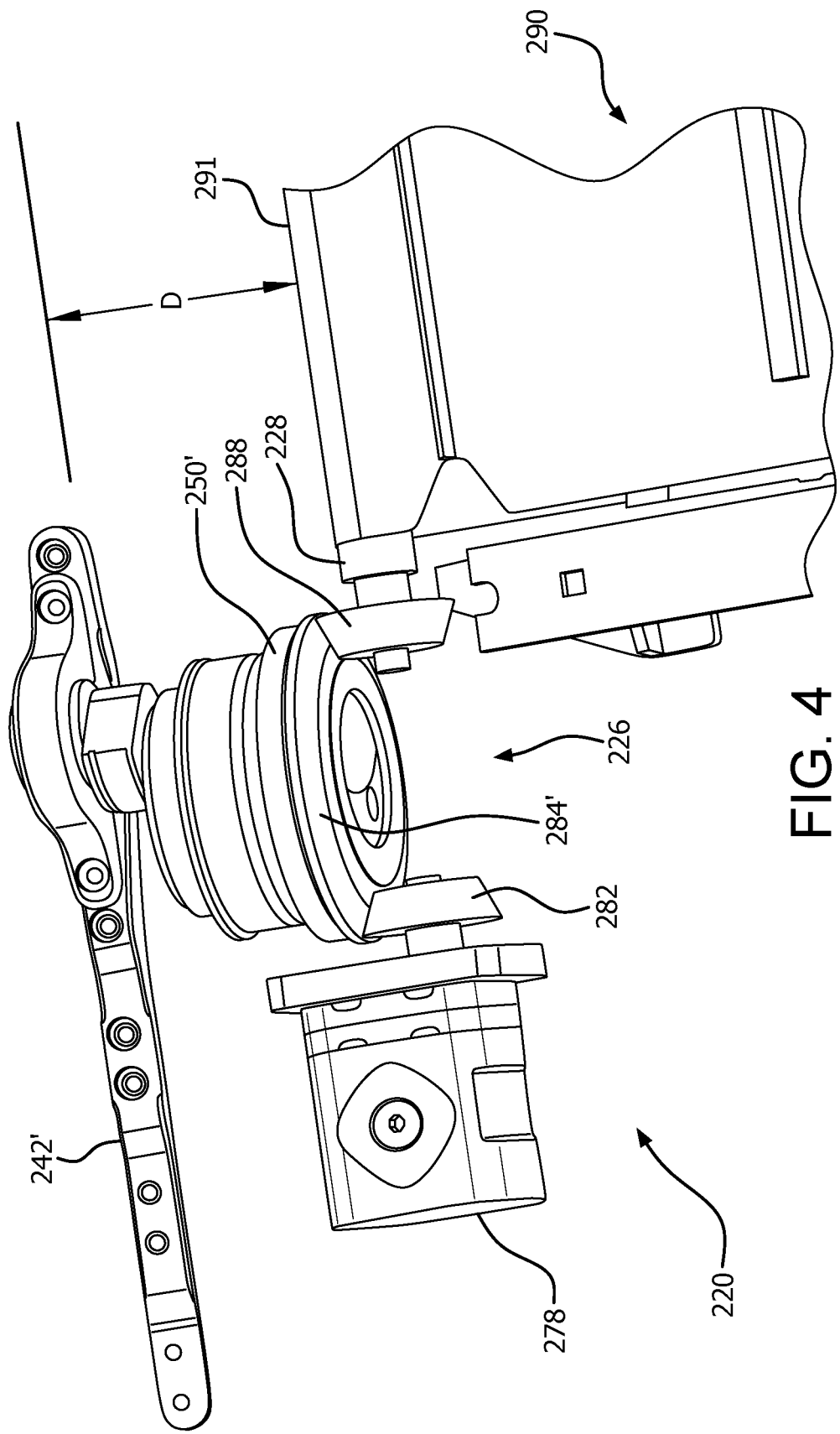
FIG. 4 is an enlarged top rear perspective view of a portion of the header of FIG. 2 with certain elements omitted for purposes of illustration.

Movement of the several components of the first and second epicyclical drives 224, 226 may be achieved as follows. Referring to FIG. 4, according to an aspect, a suitable driver or drive mechanism 278 such as a motor (e.g., a hydraulic or electric motor, see FIGS. 2 and 4), a power take-off (PTO) shaft, belts, chains, a driven drive shaft or a combination of such drivers drives a gear (e.g., a bevel gear) 282 operatively connected to one of the first and second epicyclical drives 224, 226 (in the illustrated example, the second epicyclical drive 226). Gear 282 engages a gear (e.g., a bevel gear) 284' affixed to second rear rotatable wheel 250' causing rotation thereof as well as second rotatable wheel 232'.

Referring to FIGS. 2 and 4, the roller shaft 228 engages a rear end about a medial side of the first and second epicyclical drives 224, 226 and is a driven shaft driven by one of the first and second epicyclical drives. In the illustrated example, the second epicyclical drive rotates in a first direction, and the roller shaft rotates the first epicyclical drive in a second direction opposite the first direction. In this regard, a first end of the roller shaft 228 and the first epicyclical drive 224 are connected by a first gear set and the second end of the roller shaft 228 and the second epicyclical drive 226 are connected by a second gear set. In particular, the first gear set comprises a first bevel gear 286 provided at a first end of the roller shaft 228 and a second bevel gear 284 provided on the first epicyclical drive 224. The second gear set comprises a third bevel gear 288 provided at the second end of the roller shaft 228 and a fourth bevel gear 284' provided on the second epicyclical drive 226.

According to an aspect, the drive mechanism, e.g., motor 278, is drivingly connected to gear 282, i.e., a fifth bevel gear, which drives the fourth bevel gear 284' carried by the second epicyclical drive 226. The fourth bevel gear 284' drives the third bevel gear 288 and thus the roller shaft 228 whose first bevel gear 286 drives the second bevel gear 284 of the first epicyclical drive 224. As a result, the first epicyclical drive 224 rotates in a direction opposite the second epicyclical drive 226. Furthermore, it is to be understood that the drive mechanism 278 may be used to drive the second gear 284 instead of fourth gear 284'.

Figure 6:
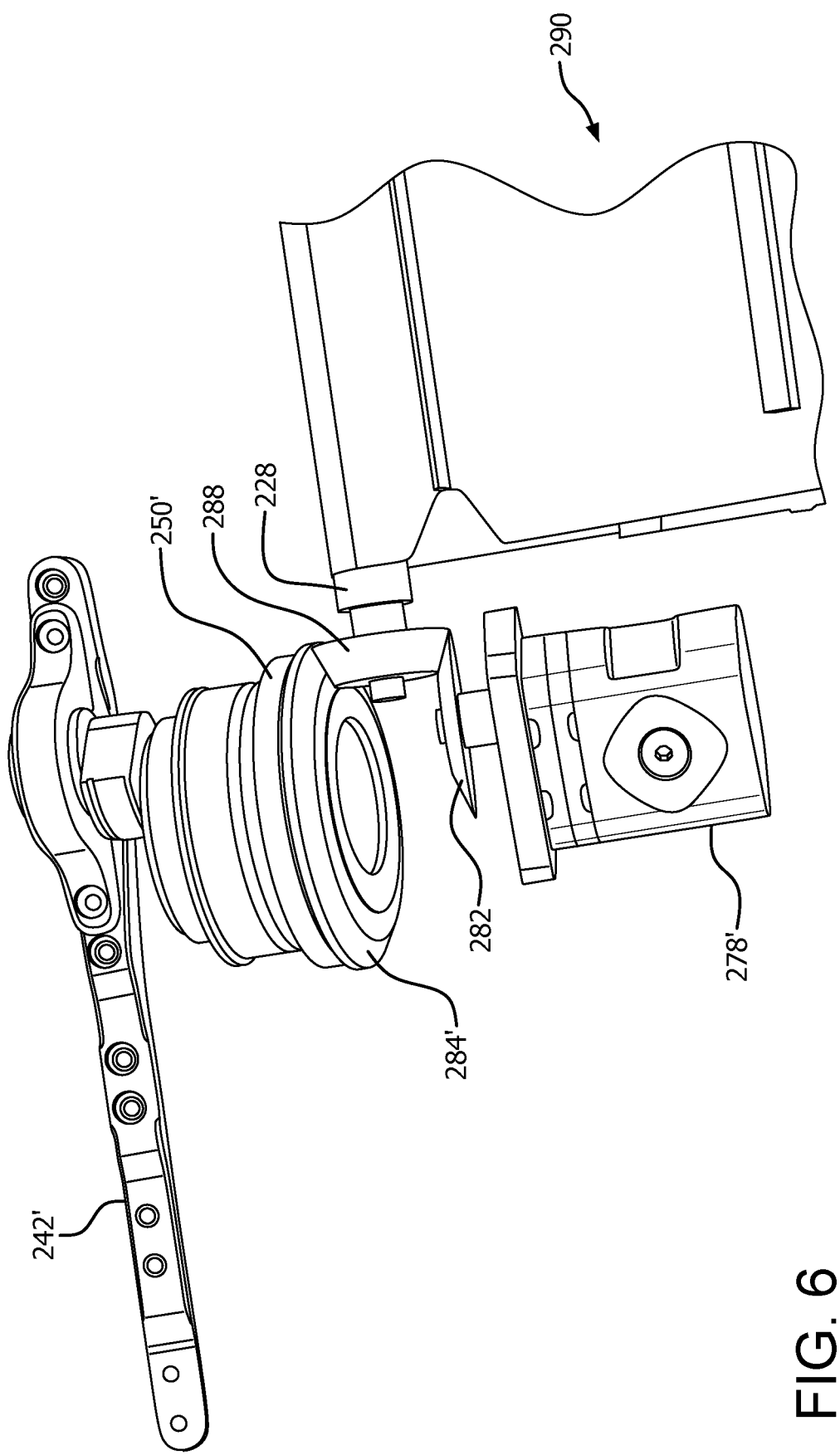
FIG. 6 is an enlarged top rear perspective view of a portion of a header in accordance with another exemplary embodiment of the subject disclosure with certain elements omitted for purposes of illustration.

Still further, referring to FIG. 6, the drive mechanism 278' may be disposed to directly drive rotation of the roller shaft 228. That is, drive mechanism 278' may be disposed opposite and rearwardly of the second epicyclical drive 226 such that the fifth bevel gear 282 drives the third bevel gear 288 connected to the roller shaft 228. Alternatively, it is to be understood that the drive mechanism 278' may be disposed opposite and rearwardly of the first epicyclical drive 224 such that the fifth bevel gear 282 drives the first bevel gear 286 connected to the roller shaft 228.

Figure 7:
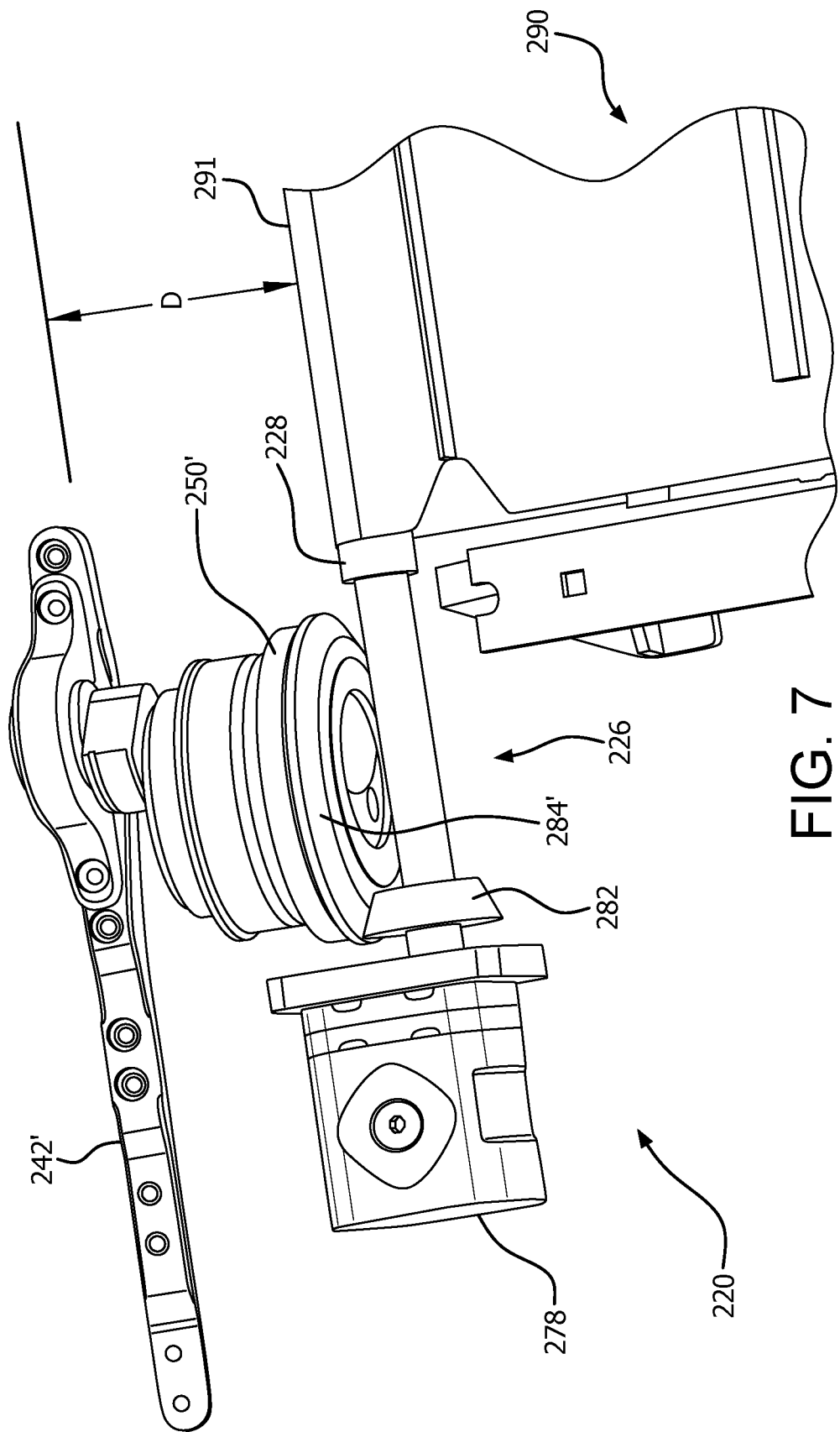
FIG. 7 is an enlarged top rear perspective view of a portion of a header in accordance with another exemplary embodiment of the subject disclosure with certain elements omitted for purposes of illustration.

Referring to FIG. 7, once again the drive mechanism may be disposed to directly drive rotation of the roller shaft 228. As illustrated, roller shaft 228 may be directly connected to bevel gear 282 which is driven by drive mechanism 278, thereby eliminating the need for bevel gear 288 of FIGS. 2 and 4. The result of such an arrangement is that the second epicyclical drive 226 and the first epicyclical drive 224 are driven to rotate in the same direction rather than opposite directions.

In other words, the drive mechanism may drive rotation of at least one of the first epicyclical drive 224, the second epicyclical drive 226, and the roller shaft 228, and rotation of the at least one of the first epicyclical drive, the second epicyclical drive, and the roller shaft causes rotation of the others of the at least one of the first epicyclical drive, the second epicyclical drive, and the roller shaft.

Referring to FIGS. 2 and 4, the header frame 103 supports the infeed conveyor 290. The infeed conveyor comprises a driven roller 292 and an endless belt 293 extending between and entrained about the driven roller 292 and the roller shaft 228. The roller shaft drives rotation of the endless belt toward the feederhouse 106. As shown in FIG. 4, the infeed conveyor is spaced a distance "D" from at least one of the first and second cutter bars 242, 242' less than about 12, 11, 10, 9, 8 and 7 inches and preferably less than about 6, 5, 4, 3, 2 and 1 inches.

Figure 5:
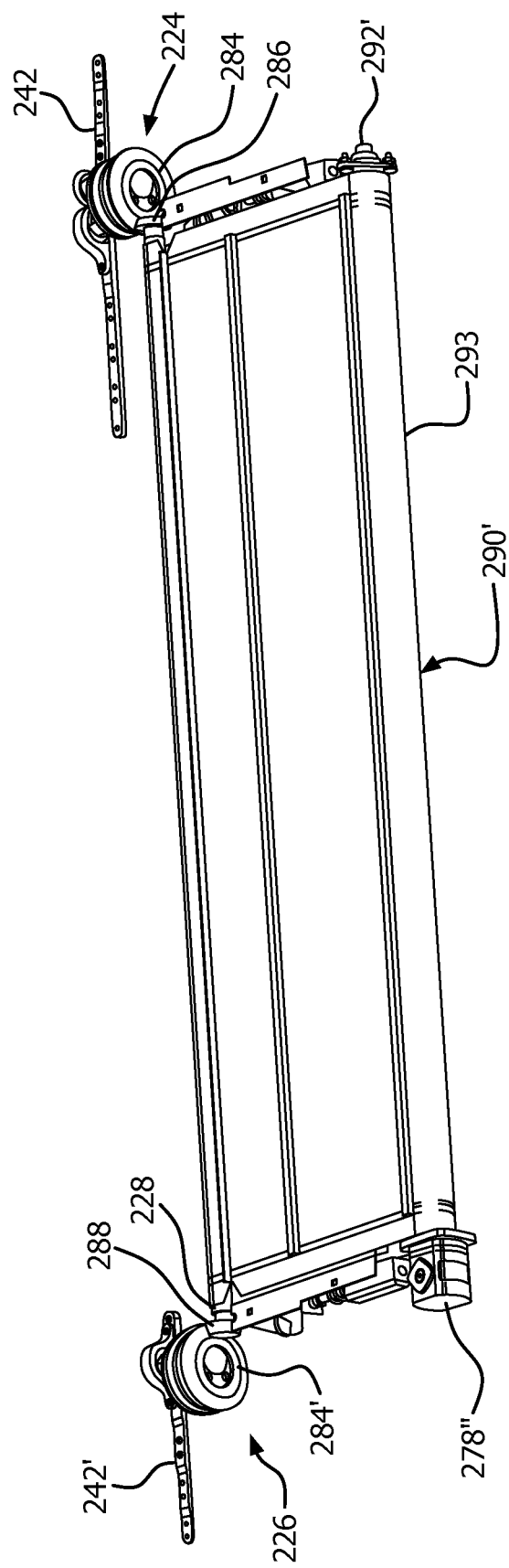
FIG. 5 is a top rear perspective view of a portion of a header in accordance with another exemplary embodiment of the subject disclosure with certain elements omitted for purposes of illustration.

Referring to FIG. 5, there is depicted another exemplary embodiment of the subject disclosure. According to this exemplary embodiment, the function of the driven roller 292 (in FIG. 2) is reversed. More particularly, in the arrangement shown in FIG. 5 wherein the infeed conveyor is identified by 290', the rear roller becomes a drive roller 292' which is rotatably driven at one end by drive mechanism 278". As a consequence, the roller shaft 228 is driven by the drive roller 292'. In this exemplary embodiment the infeed conveyor 290' comprises a drive roller 292' and an endless belt 293 extending between and entrained about the drive roller 292' and the driven roller shaft 228. So constructed and arranged, the drive roller 292' drives rotation of the endless belt 293, which drives rotation of the roller shaft 228, which then drives rotation of the first and second epicyclical drives 224, 226.

According to an aspect of the exemplary embodiments, the roller shaft 228 has a longitudinal length greater than a width of the infeed conveyor 290 or 290' and the infeed conveyor is positioned between the first and second epicyclical drives 224, 226. Furthermore, the forward end 291 of the infeed conveyor is adjacent at least one of the first and second cutter bars 242, 242'.

In addition, it is understood the roller shaft 228 could be constructed as a single roller or built up of two or more rollers connected end-to-end in order to transmit motion between the first and second epicyclical drives. Similarly, the roller could be fabricated as one piece or constructed of a through shaft inside a tube with the tube ends necking down to the through shaft.

According to an exemplary embodiment of the subject disclosure, a header is provided that has epicyclical knife drives 224, 226 connected by the roller shaft 228, whereby the roller shaft operates to drive rotation of the infeed conveyor 290. According to another exemplary embodiment, a header is provided that has epicyclical knife drives 224, 226 connected by the roller shaft 228, whereby the drive roller 292 operates to drive rotation of the infeed conveyor 290'. In addition, by virtue of the anterior or substantially anterior facing arrangement of the epicyclical drives according to the subject disclosure, the vertically oriented or substantially vertically oriented first and second rotatable wheels 232, 232' with their horizontal or substantially horizontal output shafts effectively disburse dirt and debris from the drives, thereby keeping bearings and seals cleaner and prolonging the service lives of the epicyclical drives.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A header for an agricultural harvester comprising:
   a frame supporting an infeed conveyor;
   a first epicyclical drive adjacent a forward end of the infeed conveyor and operatively connected to a first cutter bar;
   a second epicyclical drive adjacent the forward end of the infeed conveyor and operatively connected to a second cutter bar; and
   a roller shaft extending between the first and second epicyclical drives and operatively connected to the first epicyclical drive, the second epicyclical drive and the infeed conveyor.

2. The header of claim 1, wherein when the second epicyclical drive rotates in a first direction, the roller shaft rotates the first epicyclical drive in a second direction opposite the first direction.

3. The header of claim 1, wherein when the second epicyclical drive rotates in a first direction, the roller shaft rotates the first epicyclical drive in the same direction as the first direction.

4. The header of claim 1, wherein the roller shaft engages a rear end of the first and second epicyclical drives.

5. The header of claim 1, wherein the roller shaft has a longitudinal axis that extends substantially parallel to a longitudinal axis of one of the first and second cutter bars.

6. The header of claim 1, wherein one of the first and second epicyclical drives is driven by the other of the first and second epicyclical drives via the roller shaft.

7. The header of claim 1, wherein the roller shaft has a longitudinal length greater than a width of the infeed conveyor.

8. The header of claim 1, further comprising a drive mechanism for driving rotation of one of the first and second epicyclical drives.

9. The header of claim 8, wherein the drive mechanism is a drive shaft that drives rotation of the infeed conveyor.

10. The header of claim 1, wherein each of the first and second epicyclical drives rotate about an axis substantially transverse to a longitudinal axis of the first and second cutter bars.

11. The header of claim 1, wherein each of the first and second epicyclical drives rotate about an axis substantially transverse to a longitudinal axis of the roller shaft.

12. The header of claim 1, wherein the infeed conveyor comprises:
    a driven roller; and
    an endless belt extending between the driven roller and the roller shaft, wherein the roller shaft drives rotation of the endless belt.

13. The header of claim 1, wherein the infeed conveyor comprises:
    a drive roller; and
    an endless belt extending between the drive roller and the roller shaft, wherein the drive roller drives rotation of the endless belt, the roller shaft and the first and second epicyclical drives.

14. The header of claim 1, wherein the infeed conveyor has a forward end adjacent one of the first and second cutter bars.

15. The header of claim 1, wherein the infeed conveyor is spaced from one of the first and second cutter bars less than about 12 inches.

16. The header of claim 1, wherein the infeed conveyor is spaced from one of the first and second cutter bars less than about 6 inches.

17. A header for an agricultural harvester comprising:
    a frame supporting an infeed conveyor;
    a first epicyclical drive adjacent a forward end of the infeed conveyor and operatively connected to a first cutter bar;
    a second epicyclical drive adjacent the forward end of the infeed conveyor and operatively connected to a second cutter bar; and
    a roller shaft extending between the first and second epicyclical drives and operatively connected to the first epicyclical drive, the second epicyclical drive and the infeed conveyor, and wherein the roller shaft engages a medial side of the first and second epicyclical drives.

18. A header for an agricultural harvester comprising:

a frame supporting an infeed conveyor;

a first epicyclical drive adjacent a forward end of the infeed conveyor and operatively connected to a first cutter bar;

a second epicyclical drive adjacent the forward end of the infeed conveyor and operatively connected to a second cutter bar; and a roller shaft extending between the first and second epicyclical drives and operatively connected to the first epicyclical drive, the second epicyclical drive and the infeed conveyor, and wherein the infeed conveyor is positioned between the first and second epicyclical drives.

* * * * *